Jan. 20, 1931.  C. T. CABRERA  1,789,425
FILTRATION PROCESS AND APPARATUS
Filed May 5, 1928  2 Sheets-Sheet 1
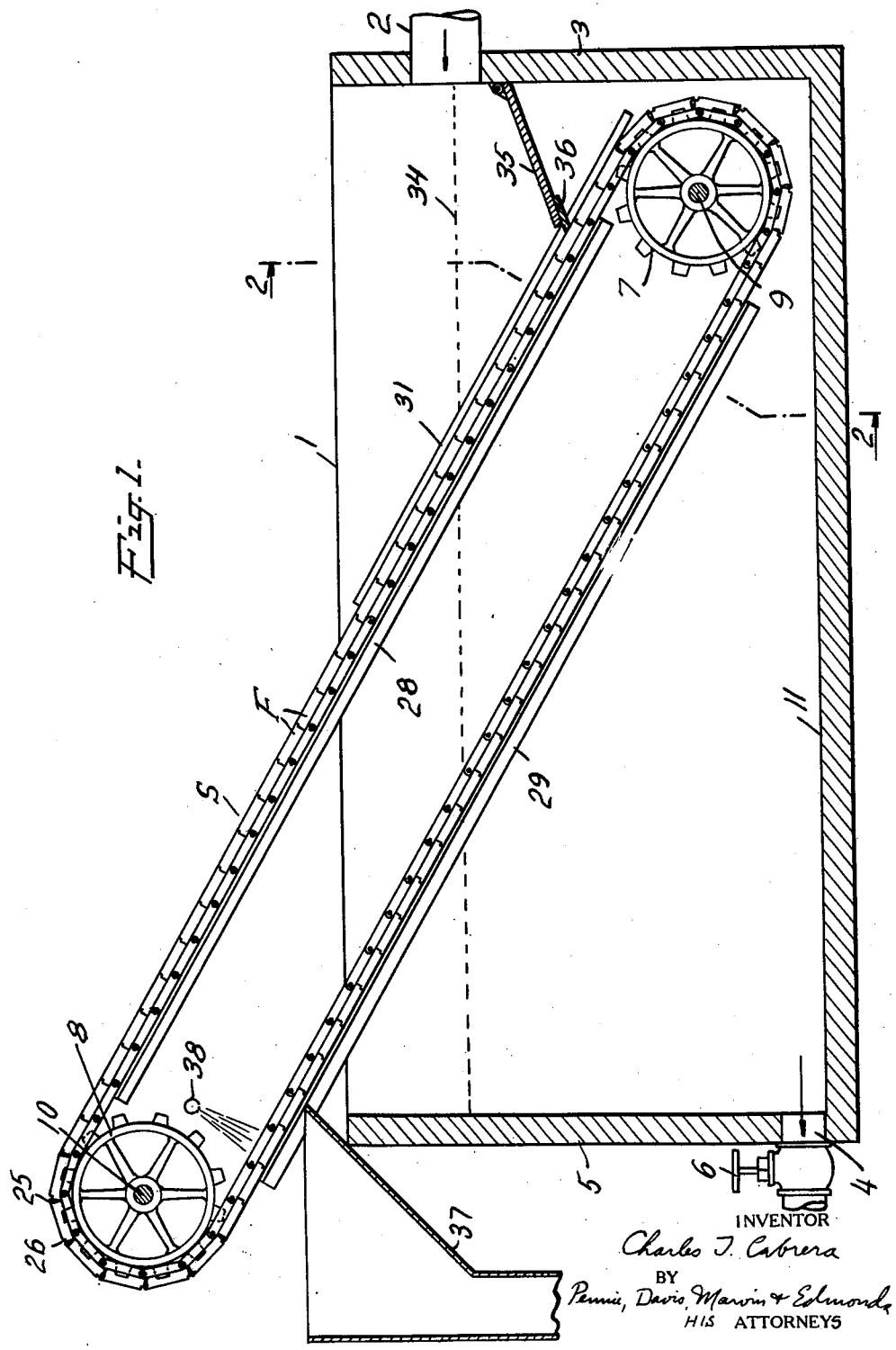

Jan. 20, 1931.  C. T. CABRERA  1,789,425
FILTRATION PROCESS AND APPARATUS
Filed May 5, 1928   2 Sheets-Sheet 2
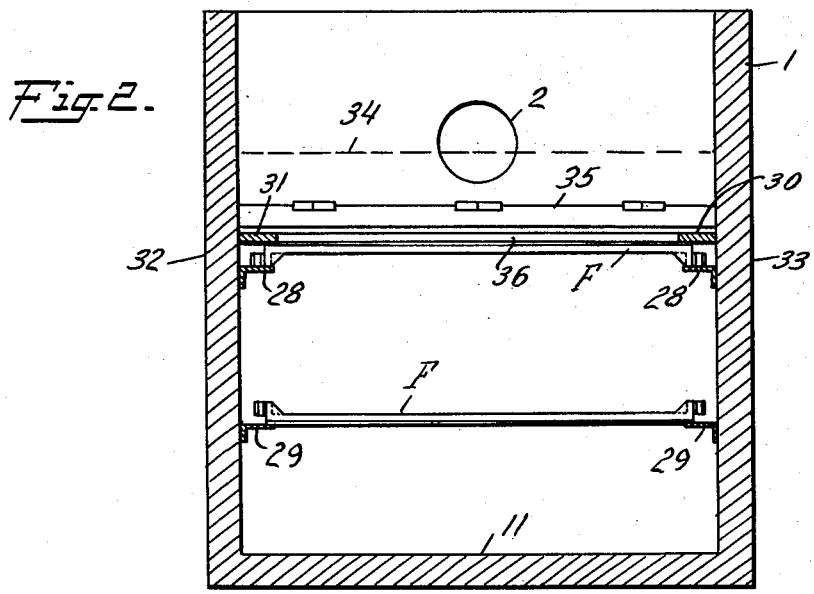
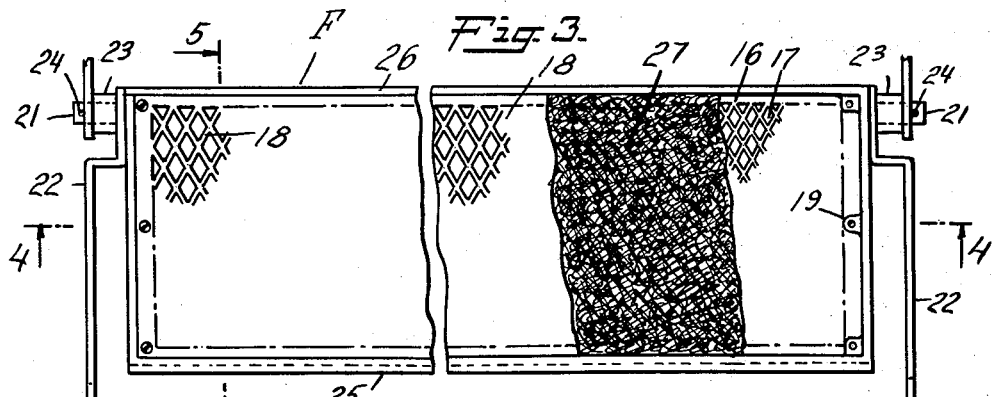
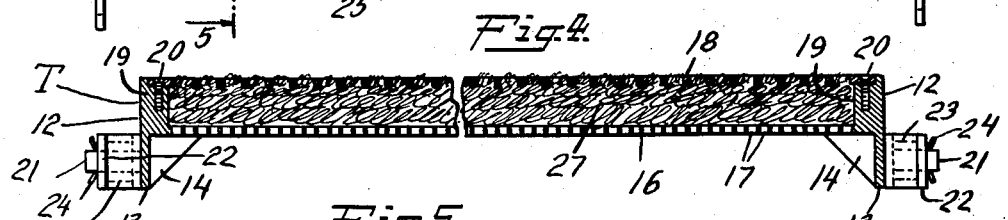
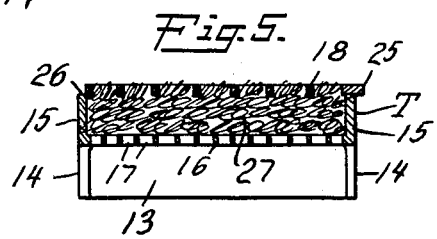
INVENTOR
Charles T. Cabrera
BY
Pennie, Davis, Marvin & Edmonds
HIS ATTORNEYS Patented Jan. 20, 1931

1,789,425

UNITED STATES PATENT OFFICE

CHARLES T. CABRERA, OF NEW YORK, N. Y., ASSIGNOR TO ELECTRO DIALYZER CORPORATION, OF NEW YORK, N. Y., A CORPORATION OF NEW YORK

FILTRATION PROCESS AND APPARATUS

Application filed May 5, 1928. Serial No. 275,330.

This invention relates to the screening and filtration of liquids, and more particularly concerns a process and apparatus for clarifying a liquid by filtering the solids therefrom while simultaneously screening or elevating certain floating or suspended insoluble solids from the liquid vehicle.

Many solid laden liquids, such as sewage and the waste liquids from pulp and textile mills or from canning or other industrial plants are subjected to various forms of treatment for the removal of the soluble and insoluble solids therefrom. These treatments, including screening or filtration through mesh screens, filter cloths or filter beds of sand or earth, have proven undesirable in that they fail to effect a complete, or substantially complete, clarification of the liquids treated, and further, in that the cost of the apparatus employed, as well as the space occupied thereby and the manual attention essential to the operation thereof is prohibitive.

A particular objection to the known forms of filtration apparatus arises from the fact that certain insoluble solids, floating upon or suspended in the liquid vehicle, become lodged upon the surface of the filtering medium, thus decreasing the flow of the liquid to the filter to an undesirable extent, and necessitating frequent cleaning of the filter surface and consequent frequent periods during which the filter must remain idle. This clogging of the filter medium by insoluble solids is particularly prevalent and objectionable in connection with the treatment of sewage, which contains large quantities of sticks, twigs, leaves and other comparatively large insoluble bodies. In order to overcome, to a certain extent, the difficulties described above, it has been heretofore proposed to pass the solid laden liquid through a comparatively coarse mesh screen before conducting this liquid to the filter, suitable means being provided for removing the insoluble bodies lodged on the screen. This solution to the problem is open to the obvious objection that it necessitates the use of an auxiliary device in addition to the filter proper, thereby increasing the cost of the apparatus and, what is often more important in congested communities, increasing the space occupied by the filtration plant. Further, the screening devices heretofore employed are unsatisfactory in that they fail to remove the insoluble objects to a sufficient extent to prevent the frequent clogging of the filter. Another difficulty encountered in connection with known types of screening devices resides in the fact that certain insoluble solids such as rounded pieces of wood or other material cannot be held on the screening surface, and roll or slide back into the liquid being treated.

With the above and other considerations in mind, it is proposed in accordance with the present invention to provide a unitary apparatus combining the features of an improved screening and skimming device and an improved filter. More particularly, the apparatus of the present invention comprises a continually moving flexible screen arranged to continuously present successive clean surfaces in the path of the solid laden liquid, the screen incorporating an improved filtering and skimming medium for removing soluble and colloidal solids, as well as insoluble solids from the liquid vehicle.

The present invention also includes improved means for automatically cleaning the filter screen employed, without interrupting the screening and filtration process.

Various other objects, advantages and characteristic features of the invention will be pointed out or will become apparent as the description thereof progresses.

The filtering medium employed in connection with the filter screen of the present invention is preferably of the type generally described in my copending application, Serial No. 233,497, filed November 15, 1927.

In describing the invention in detail, reference will be made to the accompanying drawings, in which:

Figure 1 is a side view, partly in section, of an embodiment of the filter screen of the present invention;

Fig. 2 is a sectional view, taken along the line 2—2 of Fig. 1 and viewed in the direction of the arrows;

Fig. 3 is a plan view of one section of the filter screen of the present invention, certain portions thereof being broken away to show the interior construction;

Fig. 4 is a sectional view, taken along the line 4—4 of Fig. 3, and viewed in the direction of the arrows; and Fig. 5 is a sectional view, taken along the line 5—5 of Fig. 3 and viewed in the direction of the arrows.

The apparatus of the present invention comprises generally, a continuously moving filter screen, arranged to present a portion of its surface in the path of the liquid to be treated while other portions of this surface are being cleansed by suitable means. Thus the filter screen apparatus is preferably arranged in an endless travelling form, successive portions thereof being alternately employed to filter the liquid and subjected to the action of cleaning means. Although the preferred embodiment of the present invention incorporates this general arrangement of the apparatus, it will be understood that the form and arrangement of apparatus may be widely varied without departing from the scope of the invention.

Referring to the drawings, in the embodiment of the invention illustrated, the filter screen apparatus is installed in a suitable tank 1 which may be constructed of any suitable material and which is preferably rectangular in shape. An inlet opening 2 is provided near the top of the tank 1 in one end wall 3 thereof and an outlet opening 4 is provided in the opposite end wall 5 of the tank at the bottom thereof, as shown. Suitable apparatus may be provided in the pipes or ducts connected to the inlet and outlet openings 2 and 4, and a valve 6 has been shown in the pipe leading from the outlet opening 4.

Referring now more particularly to the filter screen proper, this device comprises an endless filter surface S, made up of a plurality of articulated filter screen sections F, and carried by two pairs of suitable sprocket wheels 7 and 8 on spaced shafts 9 and 10 respectively. The shaft 9 is suitably journalled within the tank 1 near the bottom thereof and adjacent to the end wall 3, while the shaft 10 is rotatably supported by suitable means at a point above the tank and outside the end wall 5 thereof. Thus the filter screen is disposed at an acute angle to the base 11 of the tank, the lower portion of the screen extending within and substantially to one lower corner of the tank, and the upper portion of the screen extending above and to one side of the tank.

The construction of the filter screen S and the supporting means therefor is shown in detail in Figs. 2 through 5. Each filter screen section F comprises a box or tray T, preferably formed of a suitable cast metal. The side walls 12 of each tray T are provided with integral downwardly extending flanges 13, suitable stiffening webs 14 being provided between the end walls 15 of the tray and the flanges 13, as shown in Figs. 4 and 5. The bottom of each tray T comprises a suitable screen, or other perforated body, and in the embodiment shown, a grid 16 having diamond shaped openings 17 therein is employed, this grid being preferably formed of metal and cast integral with the walls of the tray. A second grid 18, similar to the lower grid 16, is secured across the top of the tray T by any suitable means. In the embodiment disclosed, the upper grid 18 rests on a plurality of lugs or extensions 19 on the side walls 15 and 12 of the tray, suitable machine screws 20 being provided to retain the grid 18 in place on these lugs. The upper grid 18 is preferably of appreciably larger mesh than the lower grid 16, and is mounted to lie flush with the upper edges of the walls 12 and 15 of the tray T.

Suitable linkage means are provided for hingedly connecting the successive filter sections F, these means being preferably arranged for engagement by the teeth of the pairs of sprockets 7 and 8. As shown in Figs. 3 and 4, a horizontal stub shaft 21 is formed integral with or suitably secured to each of the flanges 13 of each tray adjacent one end thereof. An off-set bracket or link 22 is also secured to each flange 13 at this point, these brackets extending along the flanges and having portions thereof spaced a sufficient distance from the tray to permit the entrance of a sprocket tooth between each side of the tray and the bracket attached thereto. A spacer or sleeve 23 is provided on each stub shaft 21, and the end of the bracket 22 of the adjacent tray is journalled on the end of the stub shaft 21 beyond the spacer 23, being retained in place by suitable means such as a pin 24. Thus the successive trays T with their brackets or links 22 form a flexible chain-like structure which may be continuously moved by the sprocket wheels 7 and 8.

In order that the solid laden liquid treated by the apparatus may be forced to flow through the filter sections F, the upper meeting edges of the trays are arranged to overlap and fit snugly together when the adjacent trays are in aligned relation. Thus a lateral extension 25 is provided along one edge at the top of each tray, and a corresponding notch or groove 26 is provided along the mating edge of each adjacent tray for the reception of such extension, as is clearly shown in Fig. 5. Since the pivot point of the linkage between successive trays is located adjacent the lowermost point thereof, the end walls 15 of the trays separate as they pass over the sprocket wheels 7 and 8, as clearly shown in Fig. 1. However, when successive trays are aligned along the spans of the filter screen, the adjacent end walls 15 thereof are brought into close contact, with the extension 25 fitting into the groove 26, and the filter screen presents an unbroken surface, thereby confining the flow of the liquid to the screen proper.

The space between the lower and upper grids 16 and 18 of each tray T is filled with a filter medium 27, this filter medium preferably comprising a mass of fragmentized metal in the form of fine strands or filaments compacted or pressed into relatively close association, materials generally known as metal wools being suitable for this purpose. The metallic wool 27 is preferably composed of two galvanically dissimilar metals such as zinc and lead, whereby strong galvanic couples are produced which materially improve the filtering action as fully explained in my copending application, Serial No. 233,497 filed November 15, 1927, referred to above.

One of the metals employed in the filter medium 27 is preferably of a comparatively light and resilient nature, while the other is somewhat heavier and more ductile. The two metals are intimately intermixed and compacted, and when combined in this manner, the heavier metal strands partially fill the interstices between the strands of resilient metal, thus holding the mass together and giving it body. The lighter resilient metal prevents the settling or matting of the filtering medium into an unduly compact and impermeable mass and further provides a degree of resilient yieldability to the liquid passing therethrough, thus causing changes in the size and location of the interstices in the mass and tending to deflect and arrest the movement within the liquid, of solid or colloidal particles which would be carried through an inert filtering medium. By the use of the filtering medium comprising a mixed wool of soft and heavy metal with light and resilient metal, a filter bed is produced which has the combined advantages of sufficiently fine interstices to give a highly efficient filtering action, and ample flexible and resilient responsiveness to the impinging liquid to prevent matting and clogging.

The fragmentized metal or metallic wool 27 is preferably compressed or squeezed between the upper and lower grids 16 and 18 of each tray T, and is permitting to protrude from the comparatively large openings of the upper grid 18 as shown in Fig. 4. The rough strands of metal wool thus extending from the upper surface of the screen S engage floating or suspended solid bodies and carry them out of the liquid on the surface of the screen. This raking or skimming action of the protruding metal strands removes from the liquid vehicle many small or rounded insoluble bodies which would roll off of the surface of an ordinary smooth screen.

The upper and lower spans of the filter screen S between the sprockets 7 and 8 are respectively supported by suitable means such as parallel pairs of angle bars or rails 28 and 29 which are suitably secured to the walls of the tank 1, as shown in Figs. 1 and 2. These supporting rails prevent the sagging of the filter screen over the spans and thereby maintain the succesive filter sections F in alignment. The upper rails 28 are so disposed as to engage the lower edges of the flange 13 at the sides of the trays T in the upper span, while the lower rails 29 are arranged to engage the upper side edges of the inverted trays in the lower span.

Means are provided for preventing the flow of the solid laden liquid around the sides or past the lower end of the filter screen, thereby insuring the filtration and screening of all of the liquid passing through the apparatus. Two side strips 30 and 31, formed of wood or any other suitable material, are respectively secured to the side walls 32 and 33 of the tank 1, being disposed to fit snugly over and bear upon the upper surface of the upper span of the screen, at the lateral edges thereof, thereby preventing the flow of the liquid past the edges of the screen. The strips 30 and 31 extend from a point well above the liquid level 34 to and beyond a point tangent to the curvature of the screen over the lower sprocket 7. A baffle plate 35 is hinged or otherwise suitably secured to the end wall 3 of the tank 1, being disposed to extend downward at an angle to this wall, with the free end thereof resting upon the upper surface of the side strips 30 and 31. An extension 36 is secured to the lower surface of the baffle plate 35 at the free end thereof, this extension being arranged to bear upon the upper surface of the filter screen, and to fit snugly between the inwardly disposed edges of the strips 30 and 31, as clearly shown in Figs. 1 and 2. The extension 36 on the baffle 35 is preferably formed of wood or some other material which is softer than the screen surface on which it bears.

Referring now more particularly to the apparatus for cleaning the filtering screen, a suitable hopper 37 is mounted outside of and adjacent the end wall 5 of the tank 1, presenting an extended opening beneath the upper end of the screen sections. The screen S is moved in the direction indicated by the arrow, and the lodged floating or suspended insoluble solids which are lifted from the liquid on the surface of the screen are dropped from the surface thereof as the screen passes over the sprockets 8, and fall into the hopper 37. In order to thoroughly cleanse the filtering medium of the screen during the operation thereof, a spraying device 38 is provided between the two spans of the screen at a point over the hopper 37. This spraying device may take any suitable form, and is preferably formed to direct a plurality of streams or a continuous sheet of cleansing fluid through the filter screen sections as they pass between the spraying device and the hopper. In this manner, the soluble, colloidal and unsoluble solids embedded in the filter medium 27 or in the upper grid 18 are washed or blown therefrom and into the hopper 37 as the screen operates. The fluid employed in the spraying device 38 may be steam, heated water or any other desired fluid or solution.

The operation of the apparatus of the present invention is as follows. The solid laden liquid to be treated is admitted to the tank 1 through the opening 2 and flows first through the upper span of the filter screen S and then through and around the sides of the lower span of this screen and finally out through the discharge opening 4. The filter screen is continuously and slowly moved, in the direction indicated by the arrow, by means of a suitable source of power such as an electric motor connected through suitable speed reducing means to the upper shaft 10. The side strips 30 and 31, together with the baffle 35 and its extension 36 direct the stream of solid laden liquid through the upper span of the filter screen, and prevent the flow of this liquid around the sides and ends of the screen.

The insoluble solids such as sticks, leaves and other floating or suspended refuse are caught upon the surface of the upper span of the screen S, and are elevated from the liquid as the screen moves diagonally upward therethrough. The rough strands of resilient metal which protrude from the upper surface of the screen S catch any small or rounded solids which may be present as the screen moves upward, thereby raking or skimming substantially all of the insoluble solids from the liquid vehicle. The soluble and colloidal solids are filtered from the liquid as it passes through the metallic wool masses of the filter sections F. As the screen passes over the upper sprocket wheels 8, the insoluble solids are dropped from the surface thereof into the hopper 37. Subsequently, each section of the filter screen passes beneath the cleansing spray 38, and is washed clean of the soluble and colloidal substances lodged therein by a suitable fluid such as steam or heated water, the solids and the washing fluid falling into the hopper 37. After being thus cleansed, the successive filter sections again enter the liquid in the tank 1, pass over the lower sprockets 7 and again screen and filter the soluble and insoluble solids from the liquid being treated.

From the description given, it will be apparent that the filter screen of the present invention comprises an endless filter bed, continuously moving through the solid laden liquid and acting to simultaneously elevate the insoluble solids and to filter the soluble and colloidal solids therefrom. Due to the nature of the filtering medium employed, as well as to the galvanic action which occurs therein, this medium presents to the liquid being treated the equivalent of a much greater area of filtering surface than the surface area of the screen sections in the path of the liquid stream. Further, due to the fact that the resilient nature of the filtering medium prevents the clogging thereof, large quantities of solid laden liquid may be continuously treated by the apparatus. The apparatus is obviously of simple and inexpensive construction, occupies a minimum amount of space, and is capable of effectively screening and filtering substantially all of the objectionable solids and impurities from sewage and like solid laden liquids.

Although the present invention has been described in connection with a single specific embodiment, it should be clearly understood that the invention is not limited to the exact structural details shown, and that various changes and modifications may be made without departing from the scope of the invention as defined by the appended claims.

I claim:

1. In a device for screening and filtering solid laden liquids, an endless filter bed comprising a relatively compact mass of finely stranded dissimilar metals, means for directing a stream of liquid through said filter bed, and means for continuously moving said filter bed whereby different portions are successively presented in the path of said liquid stream.

2. In a device for screening and filtering solid laden liquids, a filter bed comprising an endless succession of interconnected containers filled with masses of stranded dissimilar metals, a liquid container, means for directing a stream of liquid through said liquid container, means for supporting a portion of said filter bed within said liquid container in the path of said liquid stream, and means for continuously moving said filter bed across said liquid stream, whereby successive portions of liquid are subjected to the filtering action of successive portions of said filter bed.

3. In a device for screening and filtering solid laden liquids, a filter bed comprising a mass of finely stranded physically dissimilar metals, means for directing a stream of liquid through said filter bed and means for continuously moving said filter bed whereby different portions thereof are successively presented in the path of said liquid stream.

4. In a device for screening and filtering solid laden liquids, a filter bed comprising a mass of intermixed filaments of galvanically dissimilar metals, means for directing a stream of liquid through said filter bed and means for moving said filter bed across said stream of liquid whereby different portions of said filter bed are successively presented in the path of said liquid.

5. In a device for screening and filtering solid laden liquids, a filter bed comprising a mass of intermixed strands of a light resilient metal and a heavy ductile metal, means for directing a stream of liquid through said filter bed and means for continuously moving said filter bed across said stream of liquid whereby different portions of said filter bed are successively presented in the path of said liquid stream.

6. In a device for screening and filtering solid laden liquids, a filter bed comprising a relatively compact mass of intermixed strands of two physically and galvanically dissimilar metals, said filter bed being in the form of a continuous surface, a liquid container, means for supporting said filter bed partly above and partly below the liquid level in said container, means for directing a stream of liquid through the submerged portion of said filter bed and means for continuously moving said filter bed whereby different portions thereof are successively presented in the path of said liquid stream and whereby the solids in the liquid are elevated therefrom on said filter bed.

7. In a device for screening and filtering solid laden liquids, a filter comprising a relative compact mass of intermixed strands of two physically and galvanically dissimilar metals, said filter bed being in the form of a continuous surface, a liquid container, means for supporting said filter bed partly above and partly below the liquid level in said container, means for directing a stream of liquid through the submerged portion of said filter bed, means for passing a cleaning fluid through said filter bed at a point above the liquid level in said container, and means for continuously moving said filter bed whereby different portions thereof are successively presented in the path of said liquid stream and whereby the solids in said liquid are elevated therefrom on said filter bed.

8. In a device for screening and filtering solid laden liquids, a filter bed comprising an endless succession of interconnected containers filled with masses of finely stranded dissimilar metals, a liquid container, means for directing a stream of liquid through said container, means for supporting said filter bed in a partly submerged position in the path of said liquid stream at an acute angle to the surface of said liquid, and means for continuously moving said filter bed through said liquid.

9. In a device for screening and filtering solid laden liquids, a filter bed comprising an endless succession of articulated filter sections, each of said sections including a filtering medium comprising a mass of intermixed and compacted strands of a light resilient metal and a comparatively heavy ductile metal, a liquid container, means for directing a stream of liquid through said container, means for supporting said filter bed in a partly submerged position in the path of said liquid stream at an acute angle to the surface of said liquid and means for continuously moving successive sections of said filter bed into and out of the path of said liquid stream.

10. In a device for screening and filtering solid laden liquids, a filter bed comprising an endless succession of hingedly connected filter sections, each of said sections including a filtering medium comprising a mass of intermixed strands of galvanically dissimilar metals, a liquid container, means for directing a stream of liquid through said container, and rotatable means for supporting said filter bed in a partly submerged position in the path of said liquid stream at an acute angle to the surface of said liquid, whereby the successive sections of said filter bed may be continuously moved into and out of the path of said liquid.

11. In a device for screening solid laden liquids, an endless surface, a mass of fragmentized metal protruding from said surface, and means for moving said surface into and out of a stream of solid laden liquid whereby insoluble solids are raked and skimmed from said liquid.

12. In a device for screening and filtering solid laden liquids, a screen comprising an endless succession of interconnected containers filled with masses of finely stranded dissimilar metals, said stranded metals protruding from the surface of said containers, a liquid container, means for directing a stream of liquid through said container, means for supporting said filter bed in a partly submerged position in the path of said liquid stream at an acute angle to the surface of said liquid, and means for continuously moving said filter bed through said liquid whereby insoluble solids are raked and skimmed from said liquid by said protruding metal strands, and whereby insoluble solids are filtered from said liquid by said mass of stranded metal.

In testimony whereof I affix my signature.

CHARLES T. CABRERA.

CERTIFICATE OF CORRECTION.

Patent No. 1,789,425.                 Granted January 20, 1931, to

CHARLES T. CABRERA.

It is hereby certified that error appears in the printed specification of the above numbered patent requiring correction as follows: Page 3, line 54, for the word "permitting" read permitted; page 5, line 111, claim 12, for the word "insoluble" read soluble; and that the said Letters Patent should be read with these corrections therein that the same may conform to the record of the case in the Patent Office.

Signed and sealed this 24th day of February, A. D. 1931.

(Seal)
                                        M. J. Moore,
                           Acting Commissioner of Patents.